(12) United States Patent
Diels et al.

(10) Patent No.: US 6,394,143 B1
(45) Date of Patent: May 28, 2002

(54) FLEXIBLE HOSE

(75) Inventors: Domin Diels, Gierle; Eric Dillen, Herenthout, both of (BE)

(73) Assignee: Plastiflex Belgium, Paal-Beringen (BE)

( * ) Notice: Subject to any disclaimer, the term of this patent is extended or adjusted under 35 U.S.C. 154(b) by 0 days.

(21) Appl. No.: 09/707,768

(22) Filed: Nov. 8, 2000

(30) Foreign Application Priority Data

Nov. 10, 1999 (EP) .............................................. 99870235

(51) Int. Cl.[7] ................................................. F16L 11/11
(52) U.S. Cl. ....................... 138/121; 138/122; 138/177; 138/DIG. 11
(58) Field of Search ................................. 138/121, 122, 138/177, 178, DIG. 11, 173

(56) References Cited

U.S. PATENT DOCUMENTS

| 4,194,081 A | | 3/1980 | Medford et al. ......... 138/121 X |
|---|---|---|---|
| 4,756,045 A | | 7/1988 | Gans et al. ............. 138/121 X |
| 5,413,147 A | * | 5/1995 | Moreiras et al. ........ 138/121 X |
| 6,131,614 A | * | 1/2000 | Eastham et al. ............ 138/121 |
| 6,116,289 A | * | 9/2000 | Hayashi ...................... 138/122 |
| 6,131,616 A | * | 10/2000 | Tatsuta et al. ............... 138/121 |
| 6,142,188 A | * | 11/2000 | Schaerfl et al. ............. 138/121 |

FOREIGN PATENT DOCUMENTS

| DE | 92 10 126 | 11/1992 |
|---|---|---|
| DE | 296 01 293 | 4/1996 |
| GB | 2 322 180 | 8/1998 |

* cited by examiner

Primary Examiner—Patrick Brinson
(74) Attorney, Agent, or Firm—Pillsbury Winthrop LLP

(57) ABSTRACT

A flexible hose (1) with a corrugated wall (2), comprising an internal surface (3) with projections (4, 5) and recesses (6, 7), said hose (1) being obtained by moulding a plastic material, wherein each internal projection (4, 5) comprises a substantially flat and smooth top face (8, 9). Each top face (8, 9) has a first width (W1) and each internal recess has a second width (W2). The ratio between first width and second width (W1/W2) is preferably larger than or equal to 2.2. The hose may comprise a hollow longitudinal protuberance or score.

6 Claims, 4 Drawing Sheets

FLEXIBLE HOSE

This invention relates to a flexible corrugated hose according to the preamble of the first claim.

Such flexible corrugated hoses find numerous applications, for instance in vacuum cleaners and other industrial applications. This and other types of hoses are often produced by blow-moulding a thermoplastic material, as this provides lightweight, flexible and inexpensive hoses. The wall of these hoses is provided with convolutions or corrugations, which results in added flexibility and crush and kink resistance. The corrugated shape makes the hose return to its original shape after being bent, compressed or stretched. Moreover, the corrugated shape prevents the hose from collapsing when the pressure inside the hose is reduced.

The corrugated shape of such a hose results in an internal surface with projections and recesses. It was found that the hose produces an annoying whistle when an air stream passes through its interior, especially at high rates of air flow. The whistle occurs when the hose is in stretched condition, but particularly when the hose is bent. The whistle is caused by resonance of audible harmonics which are created when the air, which is blown or sucked through the hose, strikes the corrugations of its internal surface.

From U.S. Pat. No. 4,756,045 a flexible hose of a plastic material is known which is produced by an extrusion blow-moulding process. The flexible hose disclosed in U.S. Pat. No. 4,756,045 has an internal surface comprising alternating projections and recesses, recesses of a greater depth and/or width alternating with recesses of a smaller depth and/or width. These alternating corrugations provide the hose with a roughened internal surface which reduces whistle by breaking up the flow of the passing air: the resonance caused by the harmonics created at the larger recesses is counteracted by the resonance caused by the harmonics created at the smaller recesses, which have a different frequency. This solution to the problem of unwanted whistle however has the disadvantage that the rougher internal surface amounts to a higher internal air resistance, giving rise to a loss of air pressure along the corrugations of the internal surface and thus to a loss of capacity of the hose.

There is thus a need for a flexible corrugated hose with which the problem of whistle can be solved without however increasing the internal air resistance of the hose. It is the object of this invention to provide a flexible corrugated hose which shows a reduced internal air resistance.

This is achieved according to the invention with the technical features of the characterising part of the first claim.

According to the invention each internal projection of the hose has a substantially flat and smooth top face. These flat top faces can prevent pressure loss on the internal protrusions and give the whole of the internal surface of the hose a smoother appearance, so that the air resistance of the interior of the hose can be reduced. By limiting pressure loss to the recesses and preventing pressure loss on the protrusions, the overall pressure loss over the entire length of the hose can be reduced.

As an air stream passes through the interior of the hose and the air strikes the side walls of the recesses, harmonics are created. Because of their substantially flat shape, the top faces form dampers for the harmonics which are created when air strikes the side walls of the internal recesses of the hose. The result is that a vibration created at one recess can be damped before the air reaches the next recess. This damping effect is supplied by the top face of the projection in between the two successive recesses. This damping effect has the advantage that less air resistance and less loss of air pressure occurs in the hose of the invention compared to the hose described in U.S. Pat. No. 4,756,045 in which the harmonics are counteracted by other harmonics of a different frequency. The damping effect in the hose of the invention reduces the amount of air vibrations created in the hose, whereas the counteracting effect in the hose described in U.S. Pat. No. 4,756,045 increases the amount of air vibrations created in the hose and causes comparatively more loss of air pressure.

An advantage of the smoother appearance of the internal surface of the hose is that less dust ends up in the internal recesses of the hose when it is used as a vacuum cleaner hose.

The ratio between the width of the top faces W1 and the width of the recesses W2 is preferably larger than or equal to 2.2, preferably $W1/W2 \geq 3.5$, in order to obtain that the damping effect exerted by the top faces can last long enough to sufficiently damp a vibration created at one recess before the air reaches the next recess. In this way interference of harmonics and a resulting production of whistle can be prevented. The first width W1 is the distance between a first intersection A of a first tangent line T1 with a second tangent line T2 and a second intersection B of a third tangent line T3 with the second tangent line T2. The second width W2 is the distance between the second intersection B and a third intersection C of a fourth tangent line T4 with a fifth tangent line T5. The first tangent line T1 touches a side wall of a first recess. The second tangent line T2 touches the top face of a first projection which is adjacent to the side wall of the first recess. The third tangent line T3 touches a first side wall of a second recess, this first side wall being adjacent to the first projection. The fourth tangent line T4 touches the second side wall of the second recess, this second side wall opposing the first side wall of this second recess. The fifth tangent line T5 touches the top face of a second projection which is adjacent to the second side wall of the second recess.

The inventor has also noted that the hose described in U.S. Pat. No. 4,756,045 and other existing hoses of a similar type are only substantially whistle-free at rates of air flow which do not exceed 115 m³/h. By providing a hose with a ratio $W1/W2 \geq 2.2$ according to the invention, preferably $W1/W2 \geq 3.5$, a hose is obtained which is still substantially whistle-free at higher rates of air flow, for example at 130 m³/h or higher. This is important because the rate of air flow of vacuum cleaners has risen from 90 m³/h in the past to 130 m³/h nowadays, so that the existing hoses are no longer applicable as they produce whistle at a rate of air flow of 130 m³/h. This feature of the hose of the invention can also be advantageous in other industrial appliances which involve a flexible hose with an air stream passing through its interior.

In order to obtain a hose with recesses which are as narrow as possible to prevent whistle especially at high flow rates, it is preferred that these recesses have substantially straight side walls which extend almost perpendicular to the longitudinal direction of the hose. In particular side walls are preferred of which the tangent line forms an angle of approximately 90 to 100° with the plane formed by top faces of the internal projections.

According to another preferred embodiment of the invention the external surface of the hose comprises projections and recesses, higher projections alternating with lower projections and these lower external projections corresponding to the substantially flat top faces of the internal projections. These lower external projections are provided to collect an excess of plastic material and to prevent that plastic material piles up onto the projections in between two internal recesses of the internal surface of the hose during the moulding process. In other words, these lower external projections permit the plastic material to take such a shape that the internal projections have a substantially flat top face.

It is also preferred that along the internal recesses of the hose the wall has a substantially uniform material thickness T. Furthermore it is preferred that the transition between the top face of each internal projection and the side wall of each internal recess is formed by a substantially rounded edge. This rounded edge preferably has a curvature with a radius which is smaller than or equal to 1.5 times the material thickness T. This is preferred because the radius of the curvature of the rounded edges has to be small enough in order to prevent that the substantially flat area of the top faces of the internal projections becomes too small, which would result in a reduction of the damping effect of the top faces and interference of harmonics which are created when a passing air stream strikes the side walls of the internal recesses, thus producing of whistle.

The hose of the present invention is further preferably provided with a hollow longitudinal protuberance or score, in which for example one or more electrical conductors, a smaller tube containing conductors and possibly also a pull relief may be embedded, or which can be used for transporting a second gas or a fluid.

The present invention also relates to a mould for moulding a flexible hose as described above. Such a mould has a wall with a corrugated surface comprising in longitudinal direction alternating projections and recesses which extend in radial direction in the mould. The projections and recesses correspond to the projections and recesses of the external surface of the hose.

The mould is preferably provided with projections and deeper recesses alternating with less deep recesses, the deeper recesses extending further into the wall of the mould. At a given supply rate of the molten plastic material in the moulding process, the less deep recesses collect an excess of the plastic material urged against the projections of the mould, thus permitting the plastic material to form a hose with internal projections which have a substantially flat top face according to the invention. The less deep recesses are capable of preventing the plastic material from piling up and forming a hose with internal projections which have a convex shape, which is unwanted as this could result in hose with a higher air resistance along its internal surface, more loss of air pressure over its entire length and a production of whistle during operation.

The less deep recesses of the mould can have any shape, but in a preferred embodiment of the invention the less deep recesses have a substantially semicircular shape. The radius of this semicircular shape is preferably about equal to the material thickness T of the wall of the hose in order to obtain that the internal projections of the hose have a substantially flat top face, and not a top face which has a convex or concave shape.

The deeper recesses of the mould have a shape which permits the plastic material to flow easily into them. With this shape a hose of the desired strength and flexibility is formed and the removal of the hose after the moulding process is facilitated. To this purpose each of the deeper recesses of the mould preferably has two opposing side walls which form an angle of approximately 90 to 100° with the longitudinal direction of the mould. Furthermore, each of these recesses preferably has a bottom width in the wall of the mould of about 2 to 3 and preferably about 2.5 times the desired material thickness T of the wall of the hose, in order to obtain a hose with recesses which are narrow enough to be able to prevent whistle and wide enough to ensure the flexibility of the hose. Also, the bottom corners of these deeper recesses preferably are slightly rounded, which can facilitate the removal of the mould from the hose. The depth of these deeper recesses is preferably about 1.5 times their bottom width in order to obtain a hose with sufficient strength.

It is preferred that the mould further has such a shape that the hose produced in the moulding process has internal projections with edges which are as little rounded as possible. To this purpose the transitions between the projections protruding from the wall of the mould and the side walls of each of the deeper recesses are preferably formed by sharp, not-rounded edges. The inventor has noted that providing the mould with such sharp, not-rounded edges does not adversely affect the strength of the hose at these edges, in other words does not lower the tear strength of the hose.

In one embodiment the mould has a wall provided with a longitudinal protuberance or score. In that way a hose can be produced which shows a corresponding hollow longitudinal score or protuberance, in which for example one or more electrical conductors, a smaller tube containing conductors and possibly also a pull relief may be embedded, or which can be used for transporting a second gas or a fluid.

The invention is further elucidated by means of the appended figures and the description of these figures. In the figures below, the same reference numbers always refer to the same parts.

Figure 1:
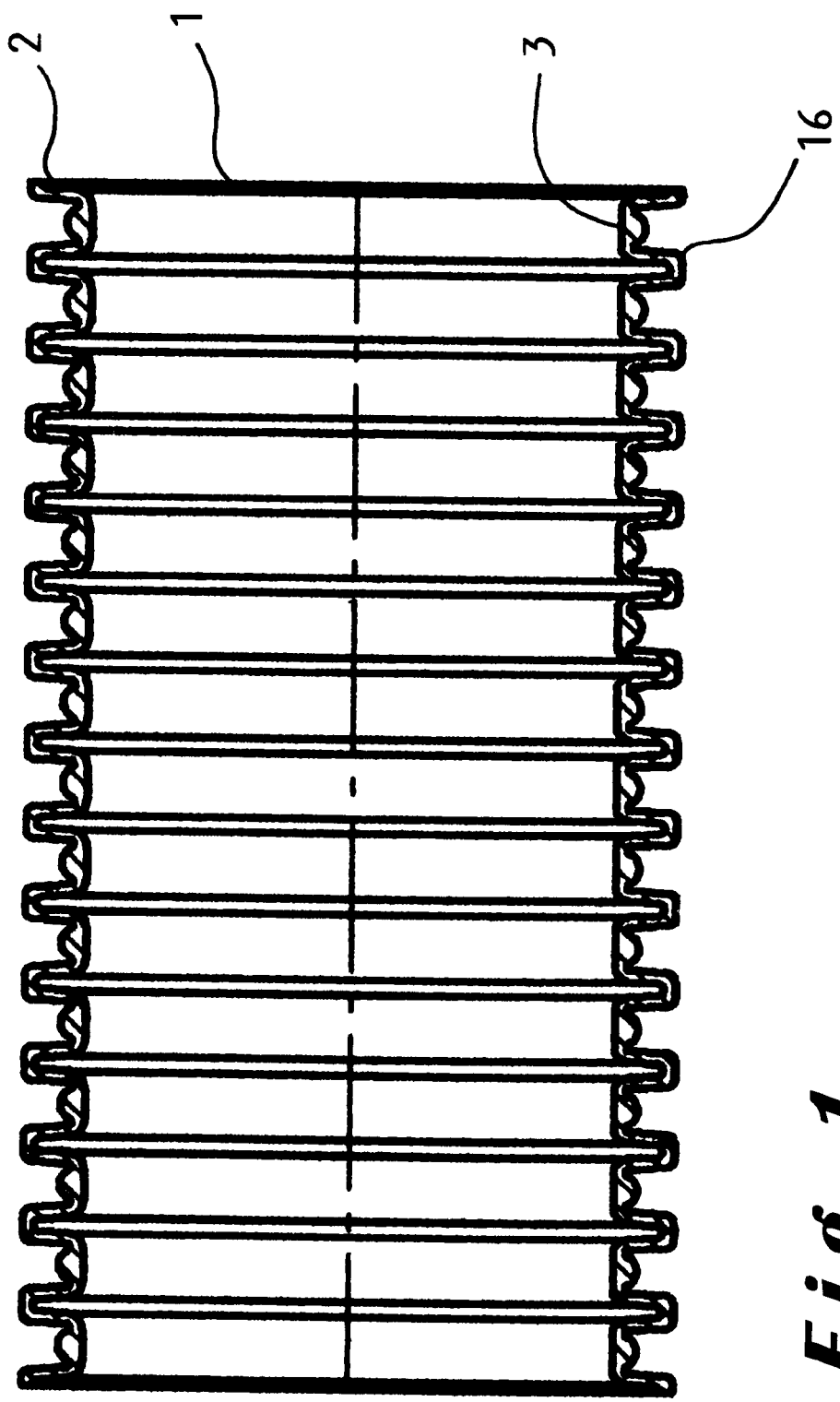
FIG. 1 shows a longitudinal section of a flexible hose with a corrugated wall according to the invention in a state in which no forces are applied to the hose.

The longitudinal section of the hose 1 shown in FIG. 1 reveals that the hose 1 has a corrugated wall 2 with an internal surface 3 which comprises projections 4, 5 alternating with recesses 6, 7, and an external surface 16 which comprises projections 23, 24 alternating with recesses 19, 20.

The hose 1 may be made by moulding a plastic material, for instance a thermoplastic or a thermosetting material. Suitable thermoplastics include polyethylene, polypropylene, copolymers thereof and any other thermoplastic material known to the person skilled in the art.

The corrugations of the wall of the hose may have a circular, helical, oval, square or any other shape known to the person skilled in the art.

Each internal projection 4, 5 shows a substantially flat and smooth top face 8, 9. The substantially flat top faces 8, 9 give the internal surface 3 of the hose 1 a smoother appearance, which can result in a lower air resistance, less loss of air pressure and a reduction of whistle. This is because the substantially flat and smooth top faces form dampers for the harmonics which are created by passing air at the recesses.

Each internal recess 6, 7 comprises two opposing side walls 10, 11, 12, 13. The top face 8, 9 has a first width W1 and the recess 6, 7 has a second width W2. The first width W1 is the distance between a first intersection A of a first tangent line T1 with a second tangent line T2 and a second intersection B of a third tangent line T3 with the second tangent line T2. The second width W2 is the distance between the second intersection B and a third intersection C of a fourth tangent line T4 with a fifth tangent line T5. The first tangent line T1 touches a side wall 11 of a first recess 6. The second tangent line T2 touches the top face 8 of a first projection 4 which is adjacent to the side wall 11 of the first recess 6. The third tangent line T3 touches a first side wall 12 of a second recess 7, this first side wall 12 being adjacent to the first projection 4. The fourth tangent line T4 touches the second side wall 13 of the second recess 7, this second side wall 13 opposing the first side wall 12 of this second recess 7. The fifth tangent line T5 touches the top face 9 of a second projection 5 which is adjacent to the second side wall 13 of the second recess 7. When the ratio W1/W2 is chosen larger than or equal to 2.2 according to the invention and preferably larger than or equal to 3.5, the top faces 8, 9 are large enough to be capable of damping a harmonic, which is created by passing air at one recess 6, before it reaches the next recess 7. In this way, interference of harmonics which are created at successive recesses can be prevented, so that no whistle occurs when an air stream passes through the hose.

In order to obtain recesses 6, 7 which are as narrow as possible and thus prevent whistle, the tangent lines T1, T3, T4 of the side walls 11, 12, 13 of the recesses 6, 7 form an angle $\alpha$ of approximately 90 to 100° with the tangent lines T2, T5 of the top faces 8, 9 of the internal projections 4, 5. This angle $\alpha$ is preferably about 93 to 94°.

Along the internal recesses 6, 7 of the hose 1 the wall 2 preferably has a substantially uniform material thickness T. The transition between the top face 8, 9 of each internal projection 4, 5 and the side wall 10, 11, 12 ,13 of each internal recess 6, 7 is formed by a substantially rounded edge 14, 15, which results naturally from the moulding process, as the molten plastic material which is urged against the sharp edges 31, 32 of the mould 21 naturally takes a rounded shape on these edges. The rounded edge 14, 15 preferably has a curvature with a radius R1 which is smaller than or equal to 1.5 times the material thickness T of the wall 2 of the hose 1. By keeping the radius R1 of the curvature of this rounded edge 14, 15 as small as possible, the overall smoother appearance of the internal surface 3 of the hose 1 is ensured. The result is that the loss of air pressure during operation of the hose can be reduced and the production of whistle can be prevented.

Figure 2:
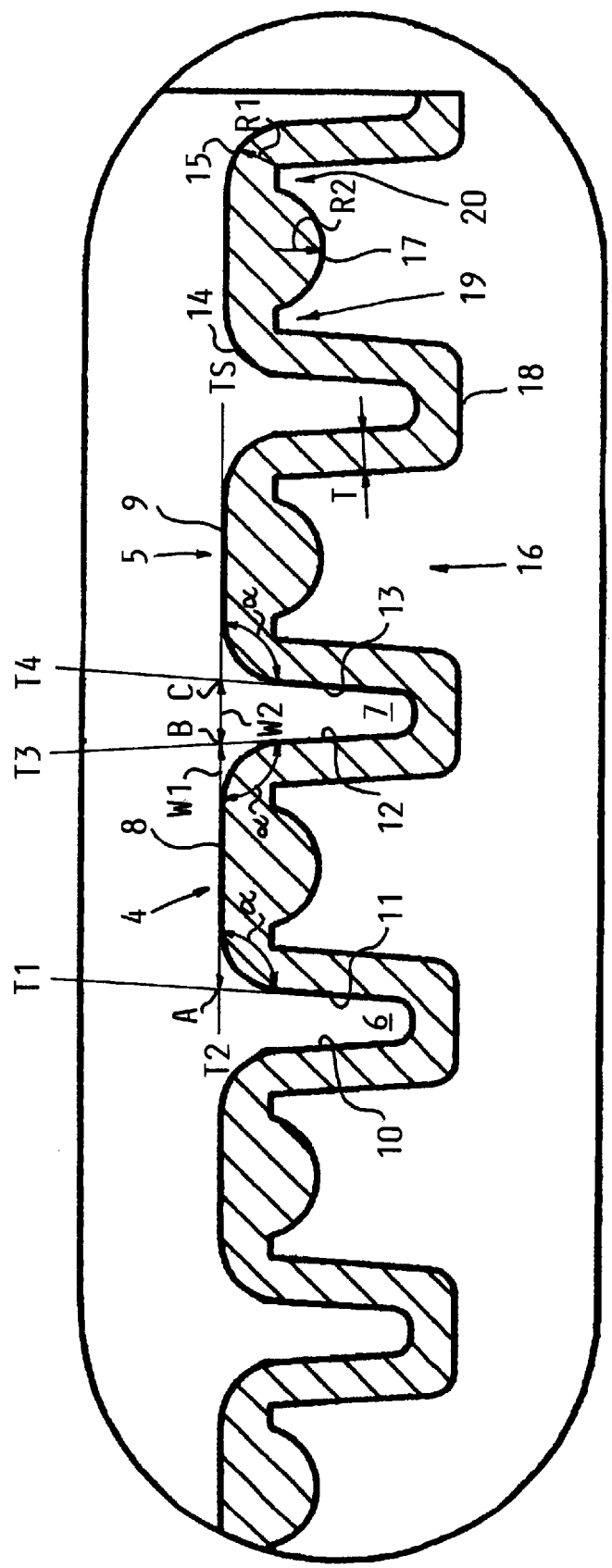
FIG. 2 shows an enlargement of a part of the corrugated wall of the hose.

As shown in FIG. 2 the hose 1 comprises an external surface 16 with projections 17, 18 and recesses 19, 20, preferably higher projections 18 alternating with lower projections 17 and these lower external projections 17 corresponding to the substantially flat top faces 8, 9 of the internal projections 4, 5. These lower external projections 17 may have a substantially semicircular shape with a radius R2 which is about equal to the material thickness T of the wall 2 of the hose 1. These lower external projections 17 are provided to collect an excess of plastic material and to prevent that plastic material piles up onto the projections between two successive deeper recesses 25 of the mould during the moulding process. In other words, these lower external projections 17 permit the plastic material to take such a shape that the internal projections 4, 5 of the hose 1 have a substantially flat top face 8, 9 and not a top face with a convex or concave shape.

The hose 1 may also be provided with a hollow score 34 or protuberance 33 in longitudinal direction which has a smaller diameter an he diameter of the hose 1. In this longitudinal score 34 or protuberance 33 for example one or more electrical conductors, a smaller tube containing conductors and possibly also a pull relief may be embedded. It may also be used for transporting a second gas or a fluid. This score 34 or protuberance 33 is provided in a moulding process by using a special mould which has a longitudinal protuberance or score. After this process one or more electrical conductors, a smaller tube containing conductors and possibly also a pull relief may be embedded in the protuberance 33 or score 34 of the hose 1, or it can be left empty in case it will be used for transporting a second gas or a fluid. The protuberance 33 or score 34 of the hose 1 can finally be closed by welding together the longitudinal edges of the hose 1, which form the transitions between the score or protuberance and the hose itself.

Figure 3:
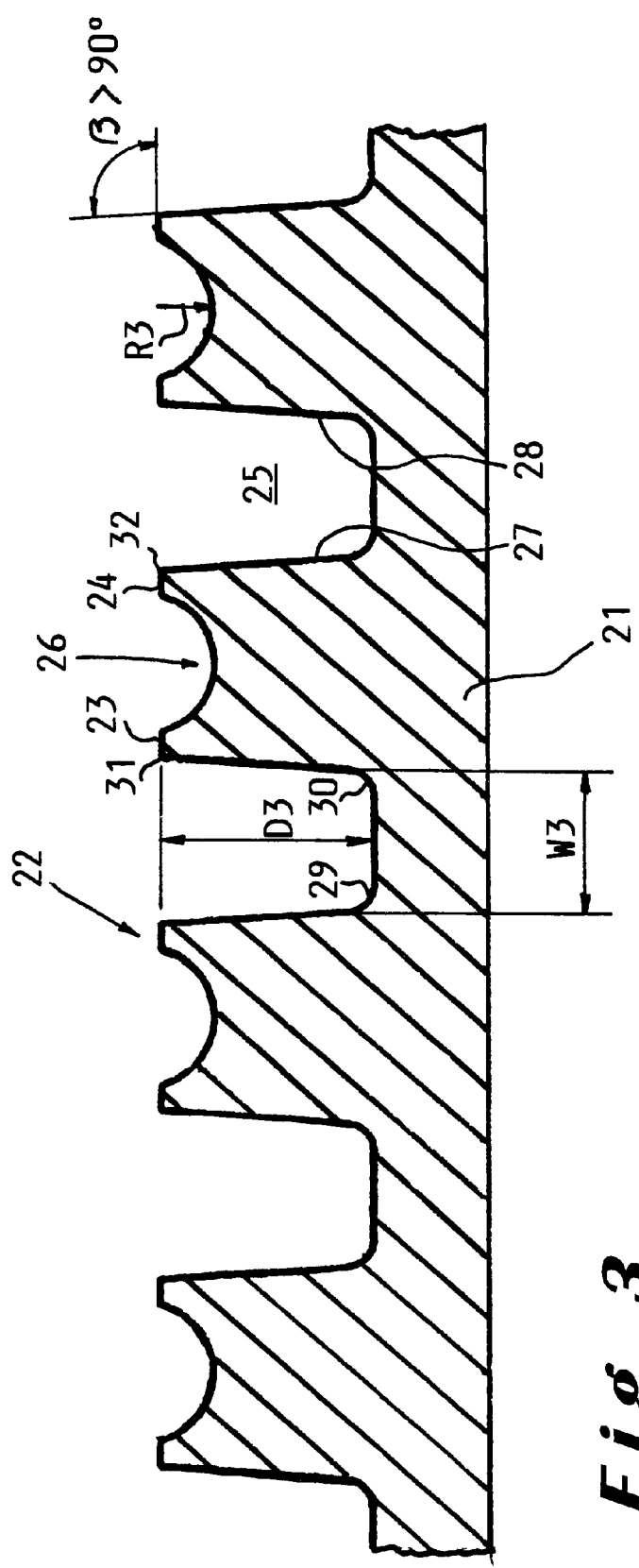
FIG. 3 shows a part of a mould for moulding a flexible hose with a corrugated wall according to the invention.
Figure 4A:
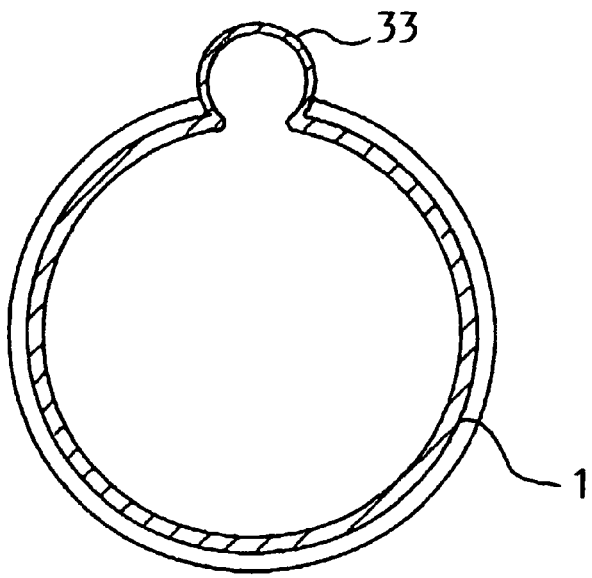
FIGS. 4a and 4b show cross-sections of hoses in which respectively a longitudinal protuberance and a longitudinal score is provided.
Figure 4B:
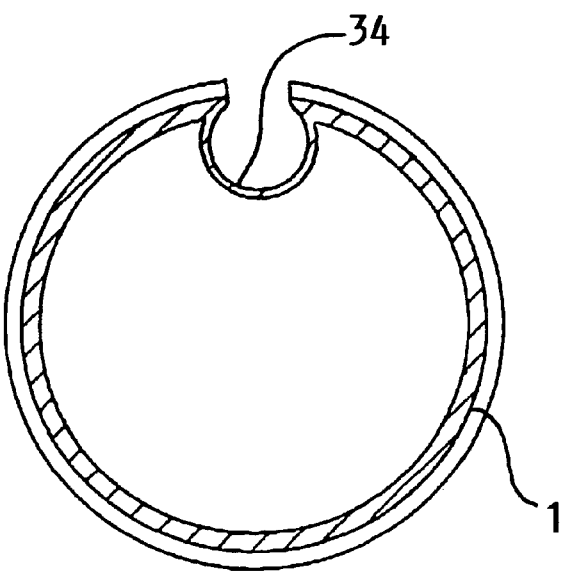

The mould 21 shown in FIG. 3 comprises a surface 22 with in longitudinal direction projections 23, 24 and recesses 25, 26, deeper recesses 25 alternating with less deep recesses 26. The deeper recesses 25 extend further into the surface 22 of the mould 21.

Suitable moulding processes for producing a flexible hose include blow-moulding processes, vacuum-moulding processes or any other moulding process known to the person skilled in the art. In a blow-moulding process molten plastic material is extruded in the interior of the mould, and then blown onto its internal surface by applying pressurised air to the centre of the plastic material. In the case of a vacuum-moulding process the mould is provided with narrow gaps which extend circumferentially and are a few tenths of a millimeter wide. Through these gaps a vacuum which is created around the outside of the mould is applied to the plastic material which is extruded inside the mould, so that the plastic material is sucked onto the internal surface of the mould. In comparison with blow-moulding, vacuum-moulding shows the advantage that a higher production speed can be obtained, in some conditions, as the vacuum applied to the outside of the mould at the same time helps for providing a longer cooling contact. However, vacuum-moulding shows the disadvantage that the narrow gaps in the mould lead to irregularities on the external surface of the hose.

A blow-moulding process using the mould 21 can be described as follows. Molten plastic material is supplied to an extruder, from which the molten plastic material is introduced between two rotating mould chains. The mould chains face each other and rotate in opposite direction in relation to each other. Each mould chain comprises several separate moulds with a length of about 6 cm and a semicylindrical score in longitudinal direction of the mould chain in which the corrugated surface is provided. On one side these two mould chains come together, pressing the separate moulds together in such a way that a mould of one mould chain is pressed against a mould of the second mould chain, the two moulds having an opposite semicylindrical score, so that a cavity is formed with the desired cylindrical, longitudinally corrugated shape. The molten plastic material is introduced in the mould at the point where the two mould chains come together. Pressurised air is blown through the centre of the cylinder of plastic material, so that it expands and is urged against the corrugated wall of the mould, the plastic material thereby flowing into the deeper and the less deep recesses and onto the projections of the mould, forming the hose 1. Thus, it can be seen that the projections 23, 24 of the mould 21 correspond to the recesses 19, 20 of the external surface 16 of the hose 1, that the deeper recesses 25 of the mould 21 correspond to the higher external projections 18 of the external surface 16 of the hose 1, and that the less deep recesses 26 of the mould 21 correspond to the lower external projections 17 of the external surface 16 of the hose 1. The less deep recesses of the mould here function as collectors for an excess of plastic material, so that the plastic material is shaped such that the internal projections of the formed hose have a substantially flat top face. Because of the rotation of the mould chains the hose is pulled away from the extruder along with the separate moulds of the two mould chains. The extrusion speed of the cylinder of plastic material is adapted to the linear speed of the mould chains in accordance with the required wall thickness T for the hose. Before the mould chains reach the point where their separate moulds come apart, the individual moulds are cooled down, so that the plastic material solidifies. Finally the rotating mould chains separate and the separate moulds are removed from the hose.

The width and depth of the less deep recesses 26 of the mould 21 are adapted to the desired material thickness T of the wall 2 of the hose 1, in other words aimed at the amount of plastic material which has to be collected in them to give the internal projections 4, 5 of the hose 1 the desired substantially flat top face 8, 9. Thus, the width and depth of the less deep recesses of the mould depends on the extrusion rate of the plastic material.

The less deep recesses 26 of the mould 21 preferably have a semicircular shape with a radius R3 which is about equal to the material thickness T of the hose 1. This radius R3 of the less deep recesses 26 of the mould 21 substantially equals the radius R2 of the lower external projections 17 of the hose 1.

It is also preferred that each deeper recess 25 of the mould 21 has two opposing side walls 27, 28 which form an angle β of 90 to 100°, preferably 93 to 94° with the longitudinal direction of the mould 21. Furthermore, each of these deeper recesses 25 preferably has a bottom width W3, measured at the bottom of the deeper recesses 25 in the wall of the mould 21, of about 2.5 times the desired material thickness T of the wall 2 of the hose 1. Also, the bottom corners 29, 30 of these deeper recesses preferably are slightly rounded. The depth D3 of these deeper recesses 25 is preferably about 1.5 times their bottom width W3. By providing the deeper recesses 25 of the mould 21 with these characteristics, the plastic material can easily flow into them in the moulding process, forming a hose 1 of the desired strength and flexibility. These characteristics of the deeper recesses 25 of the mould 21 also facilitate the removal of the mould 21 from the hose.

It is further preferred that the transition between each projection 23, 24 and the side wall 27, 28 of each of the deeper recesses 25 is formed by a sharp, not-rounded edge 31, 32. This has the advantage that the hose 1 produced in the moulding process has internal projections 4, 5 with edges 14, 15 which may be rounded but preferably as little as possible, which is wanted to possibly reduce whistle.

REFERENCE LIST 1 hose
2 wall
3 internal surface
4, 5 internal projection
6, 7 internal recess
8, 9 top face
10, 11 side wall
12, 13 side wall
14, 15 rounded edge
16 external surface
17 lower external projection
18 higher external projection
19, 20 external recess
21 mould
22 surface
23, 24 projection
25 deeper recess
26 less deep recess
27, 28 side wall
29, 30 bottom corners
31, 32 sharp, not-rounded edge
33 protuberance
34 score
W1 width of top face
W2 width of recess
W3 bottom width of deeper recess
D3 depth of deeper recess
A, B, C intersection
T1, T3, T5 tangent line of side wall
T2, T4 tangent line of top face
α angle between T1, T3, T4 and T2, T5
β angle between side wall and longitudinal direction of the mould
T material thickness
R1 radius of rounded edge
R2 radius of lower external projection
R3 radius of less deep recess

What is claimed is:

1. A flexible hose comprising:

a corrugated wall (2), including an internal surface (3) with projections (4, 5) and recesses (6, 7), said hose (1) being obtained by moulding a plastic material, each internal projection (4, 5) comprising a substantially flat and smooth top face (8, 9), wherein each internal recess (6, 7) includes two opposing side walls (10, 11, 12, 13), said top face (8, 9) having a first width (W1) and said recess (6, 7) having a second width (W2), the ratio between first width and second width (W1/W2) being larger than or equal to 2.2, the first width (W1) being the distance between a first intersection (A) of a first tangent line (T1) with a second tangent line (T2) and a second intersection (B) of a third tangent line (T3) with the second tangent line (T2), the second width (W2) being the distance between the second intersection (B) and a third intersection (C) of a fourth tangent line (T4) with a fifth tangent line (T5), the first tangent line (T1) touching a side wall (11) of a first recess (6), the second tangent line (T2) touching the top face (8) of a first projection (4) adjacent to said side wall (11) of the first recess (6), the third tangent line (T3) touching a first side wall (12) of a second recess (7), said first side wall (12) being adjacent to a first (4) of said projections (4), the fourth tangent line (T4) touching the second side wall (13) of the second recess (7), said second side wall (13) opposing the first side wall (12) of said second recess (7), and the fifth tangent line (T5) touching the top face (9) of a second projection (5) which is adjacent to the second side wall (13) of the second recess (7).

2. A flexible hose according to claim 1, wherein the tangent line (T1, T3, T4) of the side wall (10, 11, 12, 13) of each internal recess (6, 7) forms an angle (α) of approximately 90 to 100° with the tangent line (T2, T5) of the top face (8, 9) of each internal projection (4, 5).

3. A flexible hose according to claim 1 characterized in that wherein the hose (1) comprises an external surface (16) with recesses (19, 20) and projections (17, 18) higher projections (18) alternating with lower external projections (17) and said lower external projections (17, 18) higher projections (17) corresponding to the substantially flat top faces (8, 9) of the internal projections (4, 5).

4. A flexible hose according to claim 1, wherein along the internal recesses (6, 7) of the hose (1) the wall (2) has a substantially uniform material thickness (T) and a transition between the top face, (8, 9) of each internal projection (4, 5) and the side wall (10, 11, 12, 13) of each internal recess (6, 7) is formed by a substantially rounded edgae (14, 15).

5. A flexible hose according to claim 4, wherein the rounded edgae (14, 15) has a curvature with a radius (R1) which is smaller than or equal to 1.5 times the material thickness (T).

6. A flexible hose according to claim 1 wherein the hose (1) comprises a hollow longitudinal protuberance (33) or score (34).

\* \* \* \* \*